United States Patent Office 3,655,651
Patented Apr. 11, 1972

3,655,651
2-METHYL - 5-PHENYL-1,2-DIHYDRO-3H-2-BENZ-AZEPINE OR A SALT THEREOF AND PROCESS FOR PREPARING SAME
David N. Harcourt and James R. Brooks, Bath, England, assignors to Allen & Hamburys Limited, London, England
No Drawing. Filed Mar. 5, 1970, Ser. No. 16,960
Claims priority, application Great Britain, July 17, 1969, 36,027/69
Int. Cl. C07d 41/08
U.S. Cl. 260—239 BB          6 Claims

ABSTRACT OF THE DISCLOSURE

The compound 2 - methyl-5-phenyl-1,2-dihydro-3H-2-benzazepine and salts thereof are provided as well as a process for their production by the cyclization of 3-(N-benzylmethylamino)-1-phenyl-prop - 1 - yne. The compound has a sedative-hypnotic effect.

This invention relates to a novel benzazepine derivative.

We have found that the cyclization of compound 3-(N-benzylmethylamino)-1-phenylprop-1-yne (I) leads unexpectedly to a novel benzazepine derivative II:

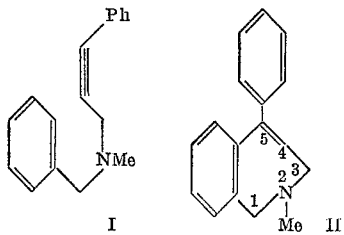

(Ph=phenyl
Me=methyl).

The invention therefore provides as a new compound the Compound II of the formula above (2-methyl-5-phenyl-1,2-dihydro-3H-2-benzazepine) and salts thereof.

This compound has been found to have a sedative-hypnotic effect as described in copending application No. 16,961 of even date herewith, of David Nigel Harcourt et al.

The production of the novel compound according to the invention from Compound I was unexpected as cyclisation with polyphosphoric acid gave as the major product the compound of Formula III:

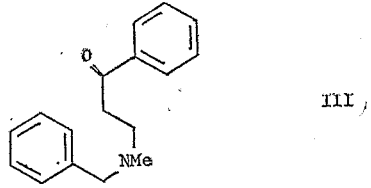

by hydration of the triple bond. Cyclisation with anhydrous aluminium chloride resulted in the compound of Formula II. The cyclisation is best effected therefore using anhydrous aluminium chloride or a similar cyclising agent.

The cyclisation is preferably effected in the presence of an organic solvent as suspending agent. Suitable organic solvents include halohydrocarbons such as chlorobenzene. The reaction may conveniently be effected by refluxing the suspension. The compound may be isolated either as the base or a salt thereof, such as the picrate or hydrochloride.

The followng example illustrates the invention.

EXAMPLE

3 - (N-benzylmethylamino)-1-phenyl-prop-1-yne (10 g.) was dissolved in chlorobenzene (50 ml.) and anhydrous aluminium chloride (20 g.) added. The suspension was refluxed for 6 hr., cooled, and water cautiously added. The chlorobenzene was separated and washed with dilute hydrochloric acid, the washings being returned to the aqueous solution. The latter was basified with sodium hydroxide (20%). Extraction yielded basic material (5.3 g.). The fraction of B.P. 146–148°/0.55 mm. (2.5 g.) was the required product.

The picrate, needles from ethanol, had M.P. 209–210° (Found (percent): C. 59.6; H, 4.4; N, 11.9. $C_{23}H_{20}N_4O_7$ requires (percent): C, 59.5; H, 4.3; N, 12.1).

What is claimed is:
1. The compound 2-methyl-5-phenyl-1,2-dihydro-3H-2-benzazepine or an acid addition salt thereof.
2. A process for the preparation of 2-methyl-5-phenyl-1,2-dihydro-3H-2-benzazepine which comprises cyclizing a compound of the formula

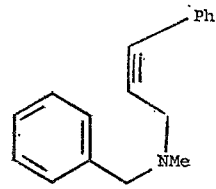

in which Ph represents phenyl and Me represents methyl in the presence of anhydrous aluminium chloride as cyclizing agent.
3. A process for the preparation of 2-methyl-5-phenyl-1,2-dihydro-3H-2-benzazepine which comprises cyclizing 3-(N-benzylmethylamino)-1-phenyl-prop-1-yne in chlorobenzene with aluminium chloride under reflux and recovering the product as the free base.
4. A process as claimed in claim 2 in which 2-methyl-5-phenyl-1,2-dihydro-3H-2-benzazepine is recovered in the form of the free base.
5. A process as claimed in claim 2 in which 2-methyl-5-phenyl-1,2-dihydro-3H-2-benzazepine is recovered in the form of an acid addition salt thereof.
6. A process as claimed in claim 5 in which 2-methyl-5-phenyl-1,2-dihydro-3H-2-benzazepine is recovered as the picrate.

References Cited

UNITED STATES PATENTS 3,225,031   12/1965   Sherlock _____ 260—239
3,242,164   3/1966    Sherlock _____ 260—239

OTHER REFERENCES

Brooks et al., J. Chem. Soc. (London), Part C, 1969, pages 625–627 (Scientific Library).

ALTON D. ROLLINS, Primary Examiner

U.S. Cl. X.R.
260—999